United States Patent [19]

Oda et al.

[11] Patent Number: 4,465,570

[45] Date of Patent: Aug. 14, 1984

[54] PROCESS FOR PRODUCING HYDROGEN

[75] Inventors: Yoshio Oda; Takeshi Morimoto; Kohji Suzuki, all of Kanagawa, Japan

[73] Assignee: Asahi Glass Company Ltd., Tokyo, Japan

[21] Appl. No.: 431,555

[22] Filed: Sep. 30, 1982

Related U.S. Application Data

[63] Continuation of Ser. No. 217,013, filed as PCT JP80/00064, Apr. 8, 1980, published as WO80/02162, Oct. 16, 1980 § 102(e) date Nov. 26, 1980, abandoned.

[30] Foreign Application Priority Data

Apr. 10, 1979 [JP] Japan .................................. 54-42544

[51] Int. Cl.³ .............................................. C25B 1/04
[52] U.S. Cl. ..................................... 204/129; 204/296; 204/290 R; 204/283
[58] Field of Search .................... 204/98, 129, 290 R, 204/290 F, 296, 283

[56] References Cited

U.S. PATENT DOCUMENTS

| | | | |
|---|---|---|---|
| 3,216,919 | 11/1965 | White et al. | 204/129 |
| 3,297,484 | 1/1967 | Niedrach | 429/41 |
| 3,379,634 | 4/1968 | Rutkowski | 204/129 |
| 4,039,409 | 8/1977 | La Conti et al. | 204/129 |
| 4,056,452 | 11/1977 | Campbell | 204/258 |
| 4,057,479 | 11/1977 | Campbell | 204/258 |
| 4,065,366 | 12/1977 | Oda et al. | 204/98 |
| 4,191,618 | 3/1980 | Coker et al. | 204/128 |

*Primary Examiner*—R. L. Andrews
*Attorney, Agent, or Firm*—Oblon, Fisher, Spivak, McClelland & Maier

[57] ABSTRACT

A process for producing hydrogen by an electrolysis of water with an aqueous solution of an alkali hydroxide is provided. It is to use an electrolytic cell prepared by bonding a gas and liquid permeable anode on one surface of a cation-exchange membrane of a fluorinated polymer and a gas and liquid permeable cathode on the other surface of the membrane. An economical metal can be used as the substance for the electrolytic cell. Hydrogen can be produced at a low voltage in stable for a long time.

9 Claims, No Drawings

PROCESS FOR PRODUCING HYDROGEN

This is a continuation, of application Ser. No. 217,013, filed as PCT JP80/00064, Apr. 8, 1980, published as WO80/02162, Oct. 16, 1980 § 102(e) date Nov. 26, 1980, now abandoned.

FIELD OF TECHNOLOGY

The present invention relates to a process for producing hydrogen. More particularly, it relates to a process for producing hydrogen at high efficiency by electrolysis of water using a fluorinated cation-exchange membrane by a special method at low voltage for a low cost.

BACKGROUND OF TECHNOLOGY

Hydrogen has been considered as new energy source replacing petroleum in various fields from the viewponts of recent energy problems.

Heretofore, an industrial process for producing hydrogen has been classified to an electrolysis of water and a thermal decomposition of a coke or petroleum.

The foremer electrolysis of water has an advantage of use of water which is easily available as a source whereas it has disadvantages that pure water should be used as water; many electrolytic apparatuses are needed; a flexibility to excess and shortage of current is not satisfactory; and a deterioration is caused by a carbonization of an electrolyte; and disadvantages from the viewpoint of a floor space and a cost of equipments are caused.

On the other hand, the latter thermal decomposition has disadvantages that an operation is usually complicated and relatively large equipments are needed to cause relatively high cost of equipments.

Recently, it has proposed to provide a process for producing hydrogen at high efficiency by electrolysis of water by contacting a cathode using platinum black as a catalyst on one surface of an ion-exchange membrane and an anode using an alloy of platinum and a reduced ruthenium oxide as a catalyst on the other surface, as an improved process for an electrolysis of water (See U.S. Pat. No. 4,039,409).

The ion-exchange membranes used in the above process have been mainly fluorinated cation-exchange membranes having sulfonic acid group as a cation exchange group. Thus, in the conventional process, the fluorinated cation-exchange membrane having sulfonic acid group itself has been used to electrolyze water, because of the characteristics of the membrane, whereby strong acidity is given in the membrane and near the membrane.

This process overcomes certain disadvantages caused by the conventional electrolysis of water and results high efficiency at low voltage. As described above, the membrane and the electrolyte near the membrane impart strong acidic condition whereby it is necessary to use expensive acid resistant substances such as noble metal for equipments for the electrolysis especially both cathode and anode and a cost for the production of hydrogen is disadvantageously high.

The invention of U.S. Pat. No. 4,039,409 has the feature of the use of the improved electrodes made of noble metal having high acid resistance.

DESCRIPTION OF THE INVENTION

An object of the present invention is to provide a process for producing hydrogen for low cost under decreasing a requirement using acid resistant substances especially noble metal substances for electrode substances which are main factors for increasing a cost of the production.

Another object of the present invention is to provide a process for producing hydrogen at a low voltage in a stable condition for a long time.

The foregoing and other objects of the present invention have been attained by a process for producing hydrogen by an electrolysis which comprises using an electrolytic cell contacting a gas-liquid permeable anode on one surface of an fluorinated cation exchange membrane and a gas-liquid permeable cathode on the other surface; feeding an aqueous solution of an alkali hydroxide into an anode compartment.

PREFERRED EMBODIMENTS FOR THE INVENTION

The present invention will be described in detail.

The anode and the cathode of the present invention are respectively brought into contact with the above-mentioned ion-exchange membrane, and accordingly, the anode and the cathode should be gas and liquid permeable. In order to impart such property, the cathode and the anode are respectively formed by a porous layer. In the electrodes made of the porous layer, a pore diameter, a porosity and an air permeability are selected to be optimum values whereby the object of the present invention will be attained as desired.

The electrodes: both of the anode and the cathode preferably have each average pore diameter of 0.01 to 30$\mu$; each porosity of 30 to 95%; an each air permeability of $1\times 1^{-6}$ to 1 mole/cm$^2$ . min . cmHg.

When the average pore diameter, the porosity or the air permeability is less than said ranges, oxygen gas or hydrogen gas generated by the electrolysis is not easily removed from the electrode to give high electric resistance whereas when one of them is more than said ranges, a contact resistance betwen the ion-exchange membrane and the electrode is too high. Both of them are not desired.

When they are in ranges of an average pore diameter of 0.03 to 20$\mu$, a porosity of 35 to 90%, an air permeability of $1\times 10^{-5}$ to $1\times 10^{-1}$ mole/cm$^2$.min.cmHg, oxygen gas and hydrogen gas are easily removed and the contact resistance is small and a stable operation can be continued for relatively long time. Therefore, such ranges are especially preferable.

The substance used for the anode need not be precious metal and can be any substance as far as oxygen overvoltage is not so high since an acid resistance is not required and can be platinum group metal such as Pt, Ir, Pd and Ru or alloys thereof or electroconductive oxides of said metal or alloy thereof, graphite, nickel or oxides containing nickel. On the other hand, the substance used for the cathode can be substances which have not an acid resistance such as iron, stainless steel, nickel, Raney nickel and stabilized Raney nickel though it is not excluded to use a substance having an acid resistance such as platinum group metals such as Pt, Ru and Rd or alloys thereof or electroconductive oxides of said metal or alloy thereof, carbon supporting said metal or oxide or graphite.

In the present invention, the process for preparing the porous electrodes using said substance is not critical and can be the desired known process as far as the electrodes having said physical properties is obtained. The substance for the electrodes can be used in a form of powder or grain preferably by bonding it with a suspension of a fluorinated polymer such as polytetrafluoroethylene. A content of the fluorinated polymer is preferably in a range of 0 to 50 wt. %, especially 5 to 30 wt. %. If necessary, it is possible to add a desired surfactant for homogeneously mixing them. Further an electroconductive filler such as graphite etc. can be added. A content of the grain having the electrode activity in the porous layer is preferably in a range of 0.01 to 30 mg./cm$^2$ especially 0.1 to 15 mg./cm$^2$.

Various processes can be employed for forming the porous layer from said substance. It is preferable to employ a process for sintering a product obtained by molding said suspension mixture into a desired mold; or a process for suction filtering said suspension mixture on a polytetrafluoroethylene film. A thickness of a porous layer is depending upon the substance for said porous layer and is preferably in a range of 0.1 to 500$\mu$ especially 1 to 300$\mu$.

The cation-exchange membrane of a fluorinated polymer used in the present invention can be membranes having sulfonic acid group (—SO$_3$H), carboxylic acid group (—COOH), or phosphonium group (—PO$_2$OH) as a cation-exchange group. An ion-exchange capacity of said ion-exchange group is preferably in a range of 0.5 to 4.0 meq/g. dry resin especially 0.8 to 2.0 meq/g. dry resin.

It is especially preferable to use a copolymer comprising the following units (a) and (b) in the copolymer.

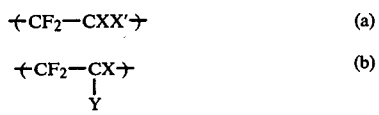

wherein X represents fluorine, chlorine or hydrogen atom or —CF$_3$; X' represents X or CF$_3$(CF$_2$)$_m$; m represents an integer of 1 to 5 and Y represents

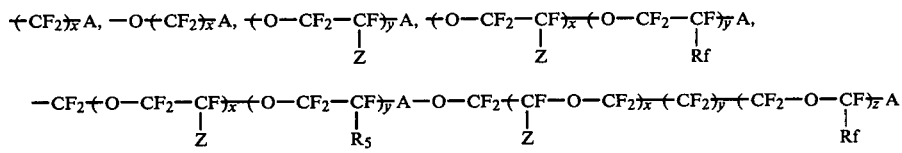

x, y and z respectively represent an integer of 1 to 10; Z and Rf represents —F or a C$_1$-C$_{10}$ perfluoroalkyl group; A represents —SO$_3$M, —COOM, —PO$_3$M$_2$ or —PO$_2$M$_2$ (M represents hydrogen atom or an alkali metal atom) or a group which can be converted into such group, for example, —SO$_2$F, —COF, —CN, —COOR, —PO$_3$R$_2$ or —PO$_3$R$_2$ (R represents a C$_1$-C$_{10}$ alkyl group).

The membrane having carboxylic acid group as the ion-exchange group among the cation-exchange membranes has superior characteristics in comparison with those of the cation-exchange membranes of the fluorinated polymer having the other ion exchange group such as sulfonic acid group. That is, it has low electrolytic voltage and stable characteristics for a long time. It is considered that the cation-exchange membrane having carboxylic acid group as the ion-exchange group has large ion-exchange capacity of 1.2 to 1.8 meq/g. dry resin and is made of a fluorinated polymer having large molecular weight.

The cation-exchange membrane need not to be made of only one polymer or a polymer having one one type ion-exchange group. For example, a laminated membrane made of two layers which have less ion-exchange capacity in a cathode side, and a membrane comprising a layer having carboxylic acid groups in a cathode side and a layer having sulfonic acid groups in an anode side can be used. Such ion-exchange membranes can be produced by the known processes. The ion-exchange membrane can be reinforced by a fabric such as cloth or net and non-woven fabric made of a fluorinated polymer such as polytetrafluoroethylene, mesh and porous substrate made of metal. A thickness of an ion-exchange membrane of the present invention is in a range of 20 to 500$\mu$ preferably 50 to 400$\mu$.

The process for forming the porous layers of the anode and the cathode on the surfaces of the cation-exchange membrane by bonding or burying them can be the process described in U.S. Pat. No. 4,039,409. The following process can be also employed. For example, the powder for the electrode is mixed with a desired binder to prepare a paste and it is coated on an aluminum foil and this paste is heated and press-bonded on the ion-exchange membrane and then, aluminum foil is dissolved with a base.

The electrolytic cell used in the present invention can be a monopolar type or a bipolar type. The substance for the electrolytic cell need not to be acid resistant as the conventional cell and accordingly, it can be economical substances such as iron, stainless steel or nickel. A current collector for feeding current to the electrode is brought into contact with an outer surface of each porous electrode. The current collector can be made of economical substance such as iron, nickel or stainless steel, and Pt, Ir, Ru or Pd or oxides thereof or a valve metal coated with such metal or metal oxide.

In the electrolysis of water by the process of the present invention, an aqueous solution of an alkali hydroxide such as potassium hydroxide, sodium hydroxide or lithium hydroxide is fed into an anode compartment having the anode which is closely brought into contact with an ion-exchange membrane; water is fed into a cathode compartment having a cathode which is closely brought into contact with the ion-exchange membrane to carry out the electrolysis. In accordance with the electrolysis, hydrogen gas and an alkali hydroxide are formed in the cathode compartment. A part or a whole of the aqueous solution of the resulting alkali hydroxide is recycled into the anode compartment and oxygen is formed in the anode compartment.

A concentration of an aqueous solution of an alkali hydroxide fed into the anode compartment is preferably in a range of 5 to 45 wt. %. When the concentration is less than said range, an effective reduction of the electrolytic voltage can not be expected whereas when it is more than said range, further reduction of the electrolytic voltage can not be expected, and a life of the cation-exchange membrane is shortened or the electrolytic cell is corroded. These are disadvantageous.

In the electrolysis, a temperature is preferably in a range of 80° to 120° C. especially 80° to 100° C. and a current density is preferably in a range of 10 to 150 A/dm$^2$ especially 20 to 100 A/dm$^2$.

The electrode reactions in the electrolysis of water by using an aqueous solution of an alkali hydroxide in the present invention for producing hydrogen and oxygen are as follows.

Cathode: 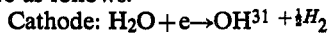

Anode: 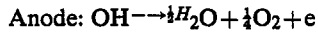

The theoretical decomposition voltage in said reactions is about 1.23 Volt. It is possible to reduce the electrolytic voltage for about 0.4 to 0.5 Volt in comparison with the electrolysis by placing electrodes departed from the cation-exchange membrane.

The present invention will be illustrated by examples.

EXAMPLE 1

A 500 mg. of platinum black powder was mixed with a dispersion of 83 mg. of polytetrafluoroethylene (Teflon 30J manufactured by IE-DuPont) and the mixture was coated on an aluminum foil in thin thickness and baked at 360° C. for 1 minute. Aluminum foil was dissolved in 20 wt. % aqueous solution of sodium hydroxide to obtain a sheet having a thickness of 20$\mu$ and an area of 100 cm$^2$.

The sheet had an average pore diameter of 0.1$\mu$, a porosity of 85%, an air permeability of 5×10$^{-3}$mole/cm$^2$.min. cmHg. This was used as an anode. On the other hand, a sheet having a thickness of 30$\mu$ and an area of 100 cm$^2$ was produced by using the same materials by similar method. The sheet had an average pore diameter of 0.1$\mu$, a porosity of 80%, an air permeability of 1×10$^{-3}$mole/cm$^2$.min.cmHg. This was used as a cathode.

A cation-exchange membrane made of a copolymer of $CF_2=CF_2$ and $CF_2=CFO(CF_2)_3COOCH_3$ which had an ion-exchange capacity of 1.45 meq/g. dry resin and a thickness of 250$\mu$ was pressbonded to the anode on one surface and the cathode on the other surface under a condition of 160° C. and 30 kg/cm$^2$. Then, it was dipped into 25 wt. % aqueous solution of sodium hydroxide at 90° C. for 16 hours to hydrolyze the ion-exchange membrane. Each current collector of platinum net was brought into contact with the cathode and the anode under a pressure, 30 wt. % aqueous solution of sodium hydroxide was fed into anode compartment at a rate of 100 to 300 cc/hour and water was fed into the cathode compartment at a rate of 40 to 120 cc/hour and an electrolysis of water was carried out. The results are as follows.

When the electrolysis was carried out at a current density of 30 A/dm$^2$ for 300 hours, a cell voltage was 1.69 Volt and the rise of the cell voltage was not substantially found.

| Current density (A/dm$^2$) | Cell voltage (V) |
| --- | --- |
| 10 | 1.51 |
| 20 | 1.61 |
| 30 | 1.68 |

EXAMPLE 2

In accordance with the process of Example 1 except using 500 mg. of powder of Pt-Ir (95:5) for the anode and using 500 mg. of stabilized Raney nickel powder (nickel content of 75%) for the cathode, the electrodes were prepared and the same ion-exchange membrane was brought into contact with them and the electrolysis of water was carried out under the similar condition. The results are as follows.

The anode had an average pore diameter of 0.1$\mu$, a porosity of 85% and an air permeability of 5×10$^{-3}$ mole/cm$^2$.min.cmHg. The cathode had an average pore diameter of 0.3$\mu$, a porosity of 75% and an air permeability of 1×10$^{-3}$mole/cm$^2$.min.cmHg.

| Current density (A/dm$^2$) | Cell voltage (V) |
| --- | --- |
| 10 | 1.53 |
| 20 | 1.64 |
| 30 | 1.72 |

When an electrolysis was carried out at a current density of 30 A/dm$^2$ for 300 days, the cell voltage was 1.74 Volt and the cell voltage did not substantially rised.

EXAMPLE 3

In accordance with the process of Example 2 except using a cation-exchange membrane made of a copolymer of $CF_2=CF_2$ and $CF_2=CFOCF_2CF(CF_3)O(CF_2)_2SO_2F$ which had an ion-exchange capacity of 0.67 meq/g. dry resin, the electrolysis of water was carried out under the same condition. The results are as follows.

| Current density (A/dm$^2$) | Cell Voltage (V) |
| --- | --- |
| 10 | 1.58 |
| 20 | 1.67 |
| 30 | 1.82 |

Industrial Usage

In accordance with the process for producing hydrogen of the present invention, it is not necessary to use expensive anticorrosive substances for the apparatus for electrolysis as the conventional process and it is especially not necessary to use precious metal as the substance for electrodes. The purpose of an industrial production of hydrogen can be attained even by using relatively economical substance used in usual, such as nickel. When a cation-exchange membrane of a fluorinated polymer having carboxylic acid groups is used, a membrane made of a fluorinated polymer having large molecular weight which had large ion-exchange capacity can be obtained whereby there is the advantage for the stable electrolysis for a long time at low voltage.

We claim:

1. A process for producing hydrogen by electrolysis, which comprises:

passing an aqueous solution of an alkali hydroxide into the anode compartment of an electrolysis cell containing an electrode configuration of a gas and liquid permeable anode bonded to one surface of a fluorinated polymer cation exchange membrane having carboxylic acid groups of an ion exchange capacity of 0.5 to 4.0 meg/g dry resin and a gas and liquid permeable cathode bonded to the remaining surface of said membrane; and electrolyzing the aqueous solution in said cell.

2. The process according to claim 1 wherein the concentration of said aqueous alkali hydroxide solution is in a range of 5 to 45 wt. %.

3. The process according to claim 1 wherein said gas and liquid permeable anode and cathode each have an average pore diameter of 0.01 to 30μ, a porosity of 30 to 90% and an air permeability of $1 \times 10^{-6}$ mole/cm$^2$·min·cmHg.

4. The process according to claim 1 wherein said gas and liquid permeable anode is formed from a platinum group metal, an alloy of a platinum group metal or an oxide of said metal or alloy thereof, graphite, nickel or an oxide containing nickel.

5. The process according to claim 1 or 4 wherein said gas and liquid permeable cathode is made of iron, nickel stainless steel or stabilized Raney nickel or a carbon supporting a precious metal.

6. The process according to claim 1, 2 or 4 wherein said cation-exchange membrane is formed from a perfluorocopolymer having carboxylic acid groups as cation-exchange groups which have an ion-exchange capacity of 0.5 to 4.0 meq/g dry resin.

7. The process according to claim 6 wherein said perfluorocopolymer contains the units (A) and (B):

$$-(CF_2-CXX')- \quad (A)$$

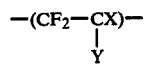  (B)

wherein X represents —F or —CF$_3$; X' represents X or CF$_3$(CF$_2$)—m; m is 1 to 5; Y represents —(CF$_2$)$_a$—A, —O—(CF$_2$)$_a$—A, —(O—CF$_2$—CF)$_b$—A, —(CF$_2$)$_a$—A, —O—(CF$_2$)$_a$—A, 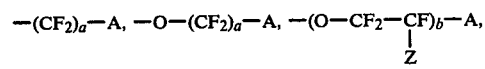

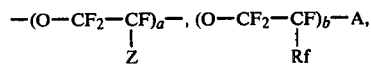

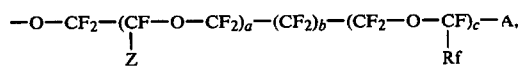

and a, b and c each range from 0 to 6; A represents, —COOM—, wherein M is hydrogen or an alkali metal atom, or a functional group which can be converted into said group by hydrolysis.

8. The process according to claim 1, 2, or 4 wherein said aqueous alkali hydroxide solution produced in said cathode compartment is recycled as the aqueous alkali hydroxide solution fed into said anode compartment.

9. A process for producing hydrogen by electrolysis, which comprises:

passing an aqueous solution of an alkali hydroxide into the anode compartment of an electrolysis cell containing an electrode configuration of a gas and liquid permeable anode formed from a platinum group metal, an alloy of a platinum group metal or an oxide of said metal or alloy thereof, graphite, nickel or a nickel containing oxide, bonded to one surface of a fluorinated polymer cationic exchange membrane having carboxylic acid groups of an ion exchange capacity of 0.5 to 4.0 meq/g dry resin and a gas and liquid permeable cathode formed from iron, nickel, stainless steel, or stabilized Raney nickel or carbon supporting a precious metal bonded to the remaining surface of said membrane; and electrolyzing the aqueous solution in said cell.

* * * * *